United States Patent
Matsuyama (10) Patent No.: US 8,485,779 B2
(45) Date of Patent: Jul. 16, 2013

(54) TURBOCHARGER

(75) Inventor: Yoshimitsu Matsuyama, Tokyo (JP)

(73) Assignee: IHI Corporation, Tokyo (JP)

( * ) Notice: Subject to any disclaimer, the term of this patent is extended or adjusted under 35 U.S.C. 154(b) by 520 days.

(21) Appl. No.: 12/743,966

(22) PCT Filed: Nov. 12, 2008

(86) PCT No.: PCT/JP2008/003284
§ 371 (c)(1),
(2), (4) Date: May 20, 2010

(87) PCT Pub. No.: WO2009/075058
PCT Pub. Date: Jun. 18, 2009

(65) Prior Publication Data
US 2010/0247296 A1    Sep. 30, 2010

(30) Foreign Application Priority Data

Dec. 12, 2007 (JP) ................................. 2007-320718

(51) Int. Cl.
*F01B 25/02* (2006.01)
(52) U.S. Cl.
USPC .......................................... 415/164; 415/165
(58) Field of Classification Search
USPC .................................. 415/159, 160, 163–165
See application file for complete search history.

(56) References Cited

U.S. PATENT DOCUMENTS

| 5,964,574 | A | 10/1999 | Meier et al. |
| 6,314,736 | B1 | 11/2001 | Daudel et al. |
| 2004/0081567 | A1 | 4/2004 | Boening |
| 2007/0172347 | A1* | 7/2007 | Battig et al. ................... 415/160 |
| 2007/0175216 | A1* | 8/2007 | Kobayashi ................... 60/605.2 |

FOREIGN PATENT DOCUMENTS

| DE | 10 2004 039 473 A1 | 3/2006 |
| EP | 1 816 317 A2 | 8/2007 |
| JP | 3-106132 | 11/1991 |
| JP | 5-214949 | 8/1993 |
| JP | 405214949 A * | 8/1993 |
| JP | 2004 132367 | 4/2004 |
| JP | 2004 278532 | 10/2004 |
| JP | 2006-125588 | 5/2006 |
| JP | 2006 125588 | 5/2006 |

OTHER PUBLICATIONS

U.S. Appl. No. 13/517,487, filed Jun. 20, 2012, Matsuyama.
U.S. Appl. No. 13/522,047, filed Jul. 13, 2012, Matsuyama et al.
Extended European Search Report issued Jul. 6, 2011, in Patent Application No. 08858564.1.

* cited by examiner

*Primary Examiner* — Edward Look
*Assistant Examiner* — Juan G Flores
(74) *Attorney, Agent, or Firm* — Oblon, Spivak, McClelland, Maier & Neustadt, L.L.P.

(57) ABSTRACT

A sealing device for prevention of exhaust gas in a scroll passage from leaking via a gap to a turbine impeller is arranged upstream, in a travel direction of the exhaust gas, of through-holes via which the vane shafts extend through a rear exhaust introduction wall, whereby pressure in a gap communicating with the through-holes of the rear wall is kept lower than pressure in an exhaust nozzle so as to displace nozzle vanes to the rear wall.

12 Claims, 11 Drawing Sheets

TURBOCHARGER

TECHNICAL FIELD

The present invention relates to a turbocharger which is simple in structure and which can reduce turbulence of exhaust gas in a turbine impeller outlet to improve efficiency of a turbine.

BACKGROUND ART

Figure 1:
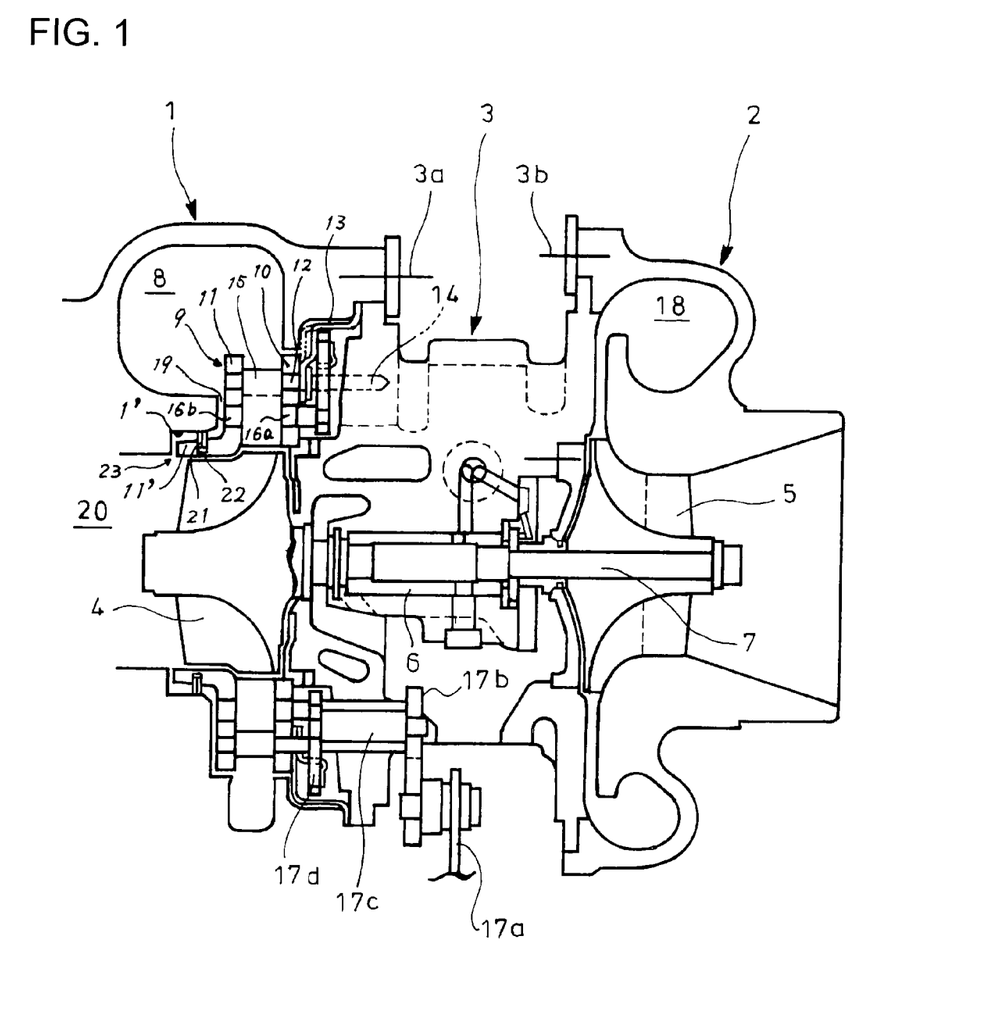
FIG. 1 is a sectional side view of a conventional turbocharger.

FIG. 1 shows a conventional variable displacement turbocharger to which the invention is applied. In the turbocharger, turbine and compressor housings 1 and 2 are integrally assembled through a bearing housing 3 by fastening bolts 3a and 3b, a turbine impeller 4 in the turbine housing 1 being connected to a compressor impeller 5 in the compressor housing 2 by a turbine shaft 7 rotatably supported via a bearing 6 in the bearing housing 3.

Figure 2:
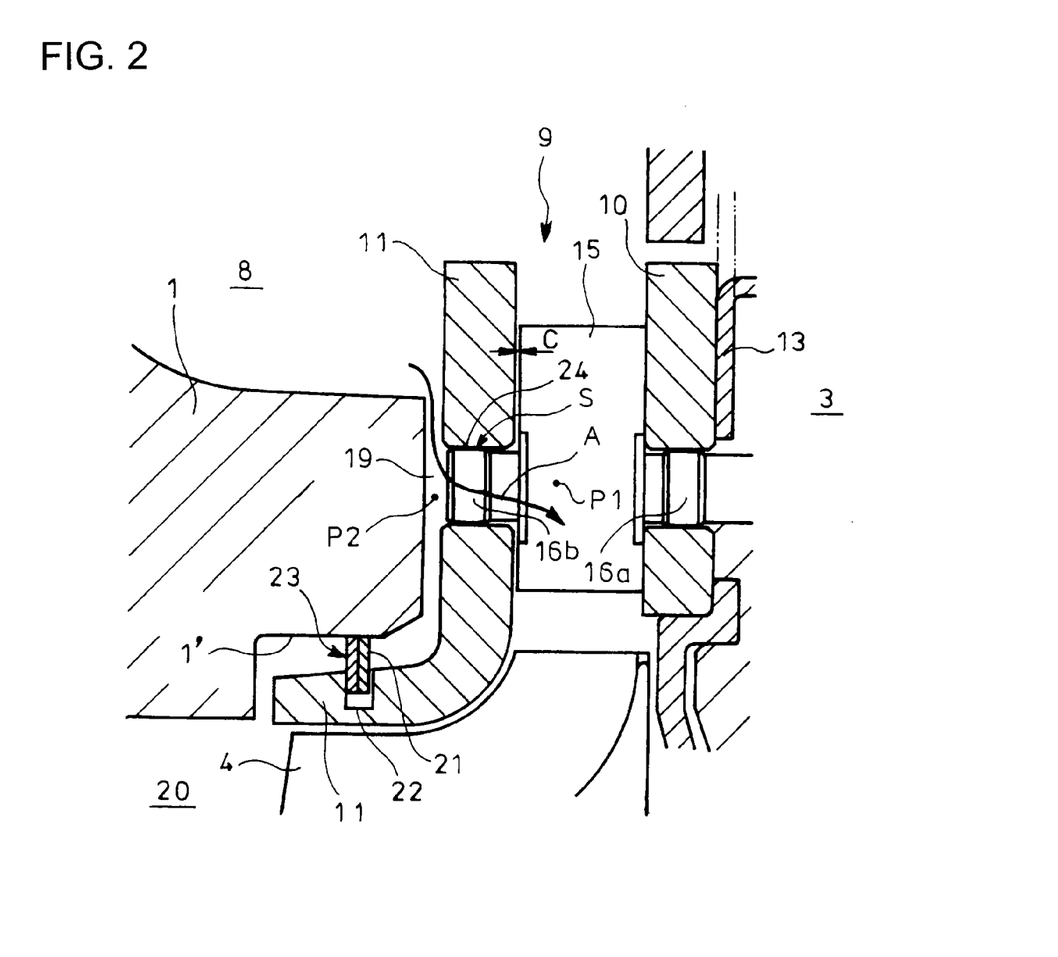
FIG. 2 is a sectional side view of the nozzle and its vicinity in FIG. 1.

As shown in FIG. 2 in enlarged scale, the bearing housing 3 is provided, on its turbine housing side, with an exhaust nozzle 9 by which the exhaust gas introduced into a scroll passage 8 in the turbine housing 1 is guided to the turbine impeller 4.

The exhaust nozzle 9 comprises front and rear exhaust introduction walls 10 and 11 on sides of the bearing and turbine housings 3 and 1, respectively, integrally assembled together with a required distance between them by, for example, three fixing members 12 arranged circumferentially. Upon assembling of the turbine and bearing housings 1 and 3, an attachment member 13 fixed on a front surface of the front wall 10 (a side surface of the bearing housing 3) is clamped by the housings 1 and 3 to fix the exhaust nozzle 9. Upon the assembling, the exhaust nozzle 9 is positioned with respect to the bearing housing 3 by a positioning pin 14.

Annularly arranged between the front and rear walls 10 and 11 are a plurality of nozzle vanes 15. In FIGS. 1 and 2, each of the nozzle vanes 15 is dually supported such that the nozzle vane 15 has vane shafts 16a and 16b fixed to opposite sides of the vane 15 and extending through the front and rear walls 10 and 11, respectively.

In FIG. 1, reference numerals 17a, 17b, 17c and 17d designate a linked transmission mechanism for control of opening angle of the vanes 15 through the vane shafts 16a; and 18, a scroll passage formed in the compressor housing 2.

Provided between the turbine housing 1 and the rear wall 11 of the exhaust nozzle 9 is a gap 19 which is unwanted by nature and which is however provided for countermeasure to, for example, possible thermal deformation of the turbine housing 1 between during being hot and during being cold and possible variations in accuracy of parts to be assembled.

The gap 19 may disadvantageously cause the exhaust gas in the scroll passage 8 to vainly leak to a turbine impeller outlet 20. Thus, in order to block the gap 19, it has been proposed to arrange sealing piston rings 21 between an outer periphery on a downstream extension 11' of the rear wall 11 and an inner surface 1' of the turbine housing 1 confronting the extension 11' so as to prevent the gas leakage and absorb thermal deformation (see Patent Literature 1).

In Patent Literature 1, as shown in FIG. 2, formed on the outer periphery of the extension 11' of the rear wall 11 is an annular groove 22 into which generally two sealing piston rings 21 are inserted with their closed gaps or cutouts being not aligned or overlapped with each other, thereby providing a sealing device 23. The piston rings 21 are pressed at their outer peripheries against the inner surface 1' of the turbine housing 1 by spring force of the piston rings themselves to prevent the gas leakage.

[Patent Literature 1] JP 2006-125588A

SUMMARY OF INVENTION

Technical Problems

In the conventional turbochargers, as shown in FIG. 2, some sealing device 23 has been devised to prevent gas leakage from the gap 19; however, even with such devised sealing device 23, it is difficult and limitative to substantially improve turbine efficiency.

Thus, the inventor has made various researches and experiments on factors other than the gas leakage affecting the turbine efficiency to find out that the more the exhaust gas in the turbine impeller outlet 20 is turbulent, the more the turbine efficiency is lowered and that the less the exhaust gas in the turbine impeller outlet 20 is turbulent, the more the turbine efficiency is improved.

With the conventional sealing device 23 with the piston rings 21 between the outer periphery of the extension 11' and the inner surface 1' of the turbine housing 1 as shown in FIG. 2, pressure P2 in the gap 19 is greater than pressure P1 in the exhaust nozzle 9; that is, P2>P1. Thus, as shown by an arrow A, the exhaust gas in the gap 19 passes through a gap S between the vane shaft 16b and a through-hole 24 into the exhaust nozzle 9 while there are preliminarily provided clearances between the nozzle vanes 15 and the front and rear walls 10 and 11, respectively, so as to make the nozzle vanes 15 pivotable and rotatable; such clearances may be different in dimension depending on individual turbochargers. Thus, it was found out that, due to pressure difference P2>P1, the respective vane shafts 16b of the nozzle vanes 15 are urged to the front wall 10 to thereby provide greater clearance C between the respective nozzle vanes 15 and the rear wall 11.

The inventor found out that such greater clearance C produced between the respective nozzle vanes 15 and the rear wall 11 increases turbulence of the exhaust gas in the turbine impeller outlet 20, resulting in lowering of the efficiency of the turbine.

The invention was made in view of the above and has its object to provide a turbocharger which is simple in structure and which can reduce turbulence of exhaust gas in a turbine impeller outlet to improve efficiency of a turbine.

Solution to Problems

The invention is directed to a turbocharger with a turbine housing having a scroll passage outwardly of an exhaust nozzle which in turn is arranged outwardly of a turbine impeller rotatably supported on a bearing housing and serves for guiding exhaust gas from the scroll passage to the turbine impeller, said exhaust nozzle having a plurality of nozzle vanes between front and rear exhaust introduction walls on sides of the bearing and turbine housings, respectively, vane shafts fixed to opposite sides of each of said nozzle vanes extending through the front and rear walls and being rotatably supported, the rear wall being arranged to have a gap between said rear wall and the turbine housing, characterized in that a sealing device for preventing the exhaust gas from said scroll passage from leaking via said gap to the turbine impeller is arranged upstream, in a travel direction of the exhaust gas, of through-holes via which the vane shafts extend through the rear wall, whereby pressure in said gap communicating with said through-holes of the rear wall is kept lower than pressure in the exhaust nozzle so as to displace the nozzle vanes to the rear wall.

In the turbocharger, preferably, a portion of each of the vane shafts extending through the rear wall which is fixed to a corresponding nozzle vane is formed with a flange shrouding a corresponding through-hole.

Advantageous Effects of Invention

According to a turbocharger of the invention which comprises a sealing device for prevention of exhaust gas from a scroll passage from passing through a gap between a turbine housing and a rear exhaust introduction wall and leaking to the turbine impeller is arranged upstream, in a travel direction of the exhaust gas, of through-holes on the rear wall, pressure in a gap communicating with the through-holes of the rear wall is kept lower than pressure in an exhaust nozzle, whereby the nozzle vanes can be displaced to the rear wall by the simple structure to minimize a clearance between the nozzle vanes and the rear wall, resulting in advantageous effect that turbulence of the exhaust gas in the turbine impeller outlet can be reduced to substantially improve efficiency of the turbine.

REFERENCE SIGNS LIST 1 turbine housing
3 bearing housing
4 turbine impeller
8 scroll passage
9 exhaust nozzle
10 front exhaust introduction wall
11 rear exhaust introduction wall
15 nozzle vane
16a, 16b vane shaft
19 gap
20 turbine impeller outlet
24 through-hole
25 sealing device
31 flange
P1 pressure in exhaust nozzle
P2 pressure in gap

DESCRIPTION OF EMBODIMENTS

Embodiments of the invention will be described in conjunction with the attached drawings.

Figure 3:
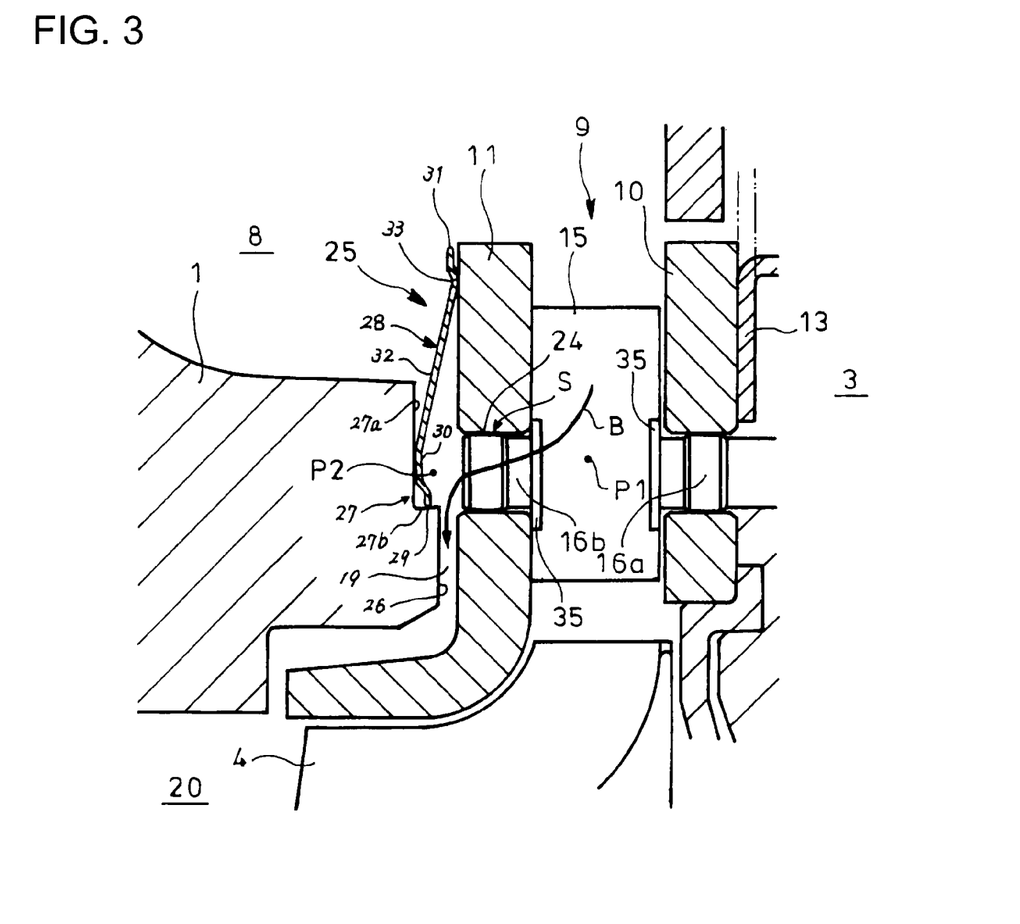
FIG. 3 is a sectional side view of a nozzle and its vicinity showing an embodiment of the invention.

FIG. 3 is an embodiment of the invention applied to the turbocharger shown in FIG. 1 with nozzle vanes 15 being arranged between front and rear introduction walls 10 and 11 of an exhaust nozzle 9 and each dually supported at its opposite sides such that vane shafts 16a and 16b oppositely fixed to the vane 15 extend through the walls 10 and 11, respectively, wherein a sealing device 25 for prevention of the exhaust gas from the scroll passage 8 from leaking to the turbine impeller 4 via a gap 19 between the turbine housing 1 and the rear wall 11 is arranged upstream, in a travel direction of the exhaust gas, of (or nearer to the scroll passage 8 than) the through-holes 24 via which the vane shafts 16b extend through the rear wall 11.

With respect to the sealing device 25 in FIG. 3, the turbine housing 1 has a portion 26 confronting a vertical surface of the rear wall 11 to provide a gap 19 therebetween. The portion 26 is cut out at its outer periphery to provide a step 27, a disc spring seal 28 being fitted between the step 27 and a rear surface of the rear wall 11. The step 27 comprises a vertical opposed surface 27a (surface substantially in parallel with the rear surface of the rear wall 11 and substantially perpendicular to an axis of the turbine impeller 4 in the embodiment shown) confronting the rear wall 11 and an annular tapered surface 27b with its diameters being decreased in a direction away from the rear wall 11. Though the bottom of the step 27 may be not the tapered surface 27b but, for example, a cylindrical surface with uniform radius with respect to the axis (even this, the disc spring seal 28 can be supported), the tapered surface 27b makes it possible to retain the disc spring seal 28 more stably and thus improve the sealing effect. Further, the tapered surface can prevent the disc spring seal 28 from moving and dropping from the step 27 upon, for example, assembling of the turbine housing.

Figure 4:
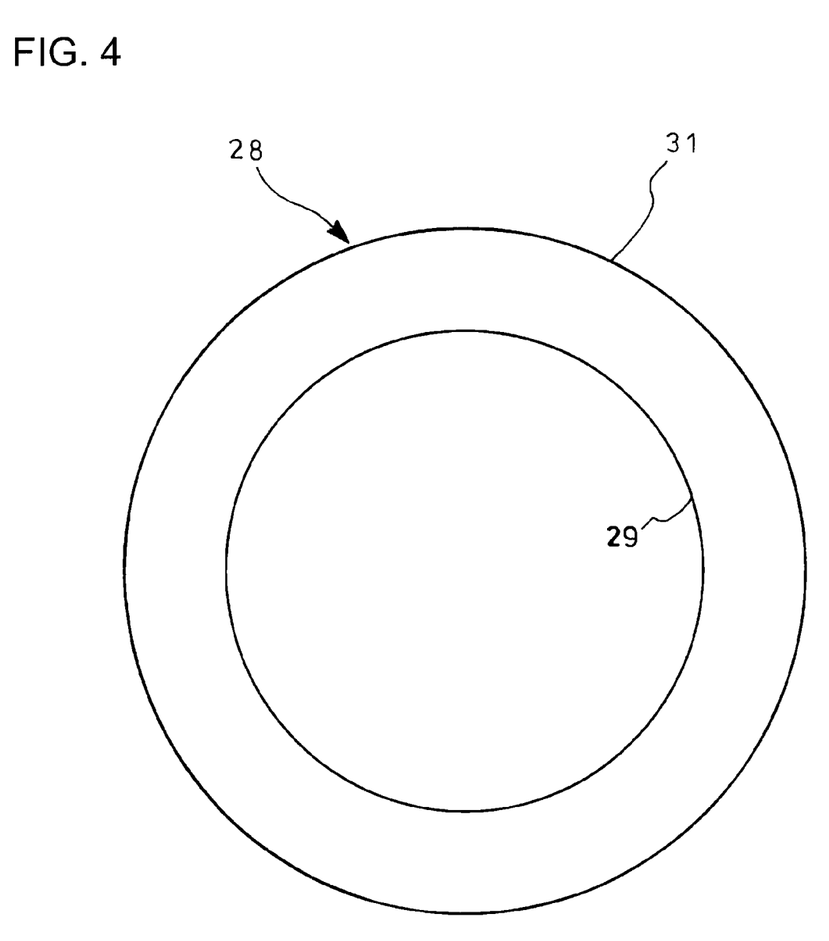
FIG. 4 is a front view showing the disc spring seal in FIG. 3.

The disc spring seal 28 is ring-shaped as shown in FIG. 4 and has a vertical rectilinear portion 30 contiguous with an inner peripheral end 29 and pressed against the vertical surface 27a, the inner peripheral end 29 being curved from the rectilinear portion 30 in a direction approaching to the rear wall 11 and then extending vertically and inwardly into substantially S-shape. Such S-shape makes it easy to push the inner peripheral end 29 onto the tapered surface 27b and the shape of the tapered surface 27b makes it difficult for the pushed-in inner peripheral end 29 to escape from the step 27. An outer peripheral end 31 of the disc spring seal 28 (outwardly of the rectilinear portion 30) has a slant portion 32 extending slantingly from the rectilinear portion 30 toward the rear wall 11 and a curved portion 33 peripherally of the slant portion 32 and curved in a direction away from the rear wall 11 and pressed against the rear wall 11.

Figure 5:
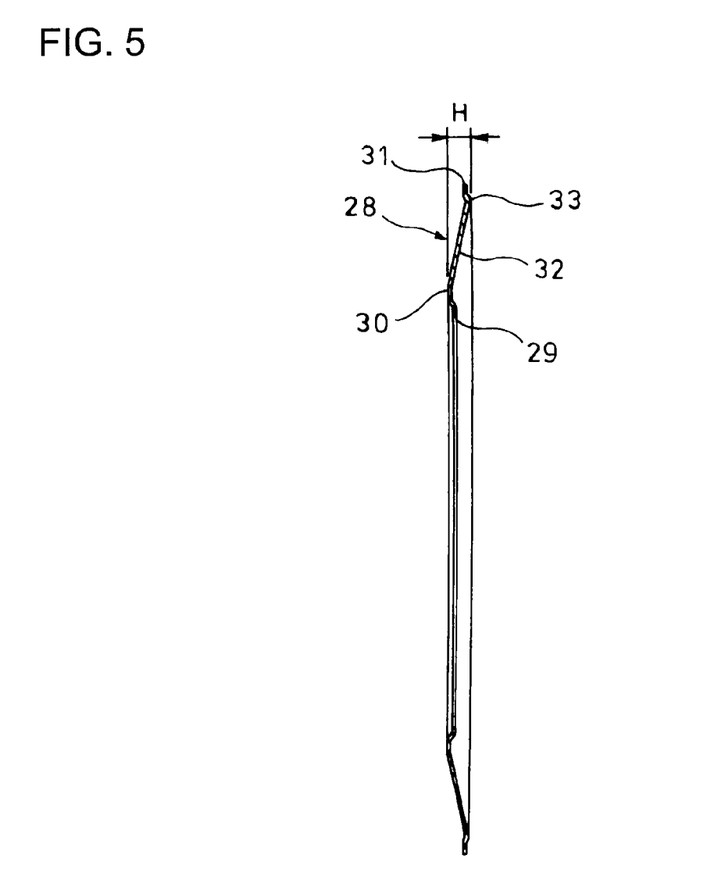
FIG. 5 is a sectional side view of the disc spring in FIG. 4

As shown in FIG. 5, the disc spring seal 28 is frustconical and has inner and outer peripheral edges 29 and 31 mutually offset with respect to an axis of the spring. An axial height H of the disc spring seal 28 with the frustconical shape is set such that a curved outer peripheral portion 33 of the seal 28 is pushed against the rear wall 11 when the inner peripheral end 29 is fitted onto the tapered surface 27b to make the rectilinear portion 30 abut against the rectilinear surface 27a.

Figure 6:
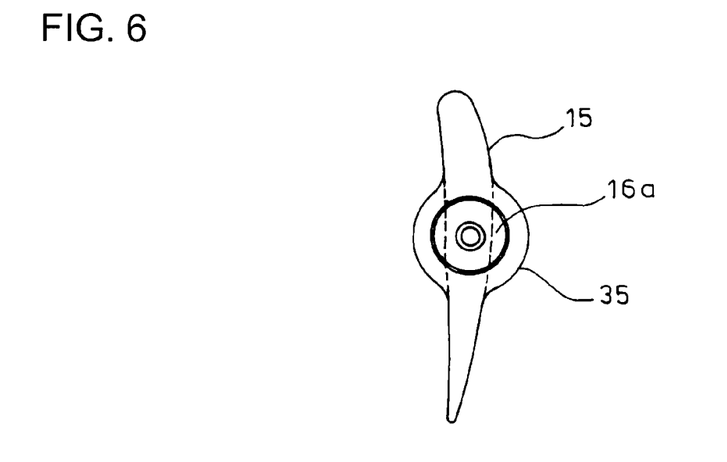
FIG. 6 is a view for explanation of a flange on a portion of the vane shaft fixed to the nozzle vane.

As shown in FIGS. 3 and 6, portions of the vane shafts 16a and 16b fixed to each of the nozzle vanes 15 for extension through the front and rear walls 10 and 11, respectively, are formed with flanges 35 which shroud corresponding through-holes 24. Such flanges 35 can prevent foreign matters from invading the through-holes 24 and prevent the exhaust gas from passing through the through-holes 24 into the gap 19. Moreover, as mentioned hereinafter, enough force can be obtained in utilization of pressure of the exhaust gas against the flanges 35 so as to make the nozzle vanes 15 move to the rear wall 11.

Figure 7:
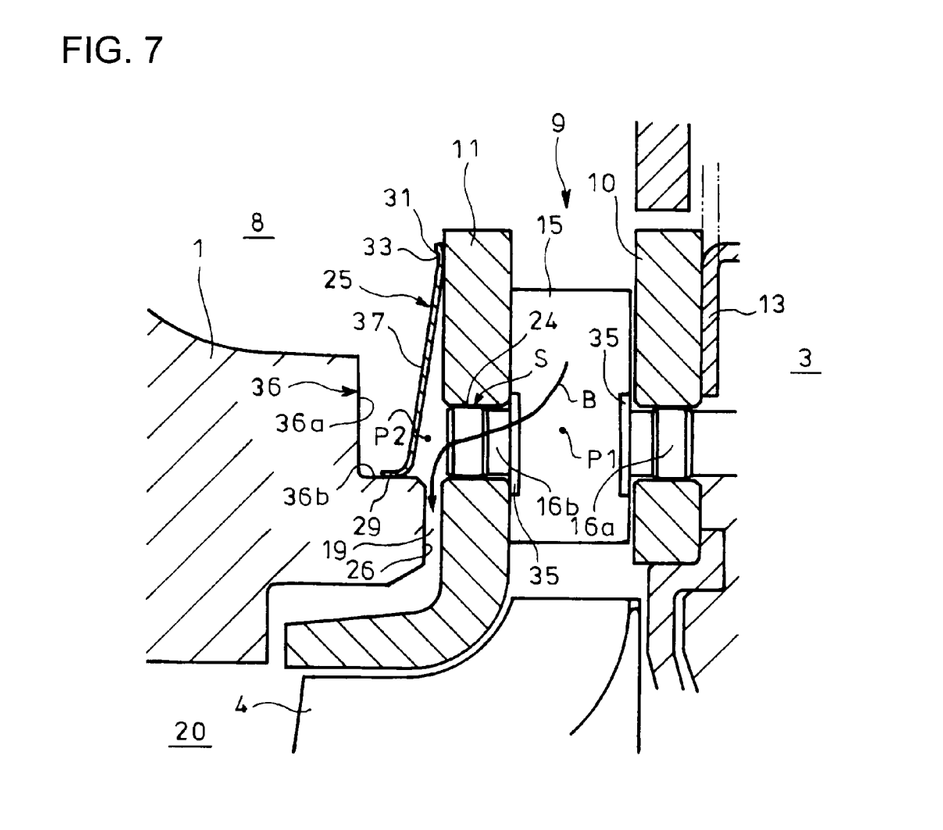
FIG. 7 is a sectional side view showing a further embodiment of the sealing device in the invention.
Figure 8:
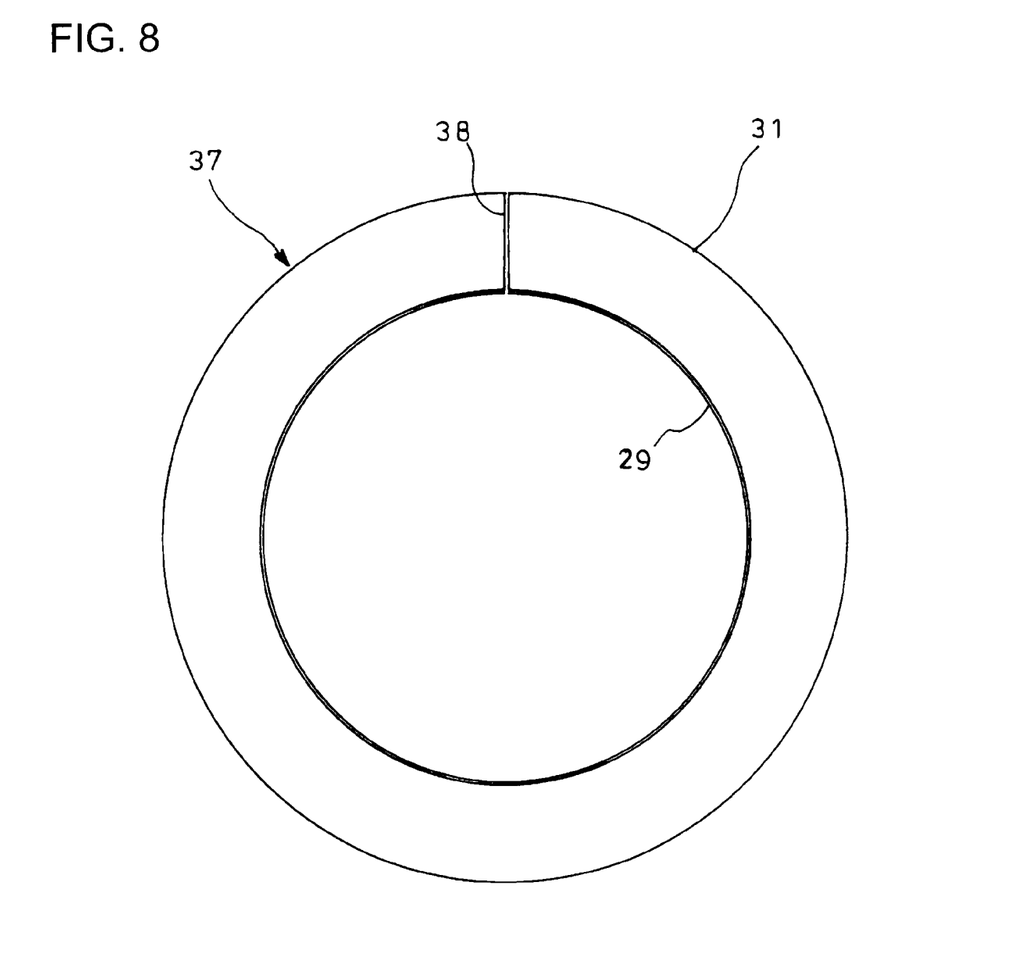
FIG. 8 is a front view of the disc spring seal in FIG. 7.

FIGS. 7 and 8 show a further embodiment of the sealing device 25 shown in FIGS. 3 and 4. With respect to the sealing device 25 in FIG. 7, a turbine housing 1 has a portion 26 confronting a vertical surface of a rear exhaust introduction wall 11 to provide a gap 19 therebetween. The portion 26 has a step 36 at its outer periphery, a disc spring seal 37 being fitted between the step 36 and a rear surface of the rear wall 11. The step 36 comprises a deeply cut out surface 36a in confrontation to the rear wall 11 and a cylindrical surface 36b in parallel with an axis of the turbine shaft 7.

The disc spring seal 37 is substantially ring-shaped and circumferentially cut out partly at 38 with a width of, for example, 0.2-0.8 mm as shown in FIG. 8. The disc spring seal 37 is shaped such that it has inner peripheral end 29 curved in a direction away from the rear wall 11 and movably and minutely fitted on the cylindrical surface 36b, is frustoconical to have increased diameters from the fitted portion toward the rear wall 11 and has an outer peripheral end 31 formed with a curved portion 33 abutting on a rear surface of the rear wall 11.

The disc spring seal 37 arranged in fitted onto the cylindrical surface 36b is moved along the cylindrical surface 36b by pressure of the exhaust gas in the scroll passage 8 (difference in pressure between the scroll passage 8 and the gap 19) so that the curved portion 33 of the outer peripheral end 31 is automatically pushed on the rear surface of the rear wall 11; the disc spring seal 37 is preliminarily shaped such that, in this case, the disc spring seal is reduced in diameter to null the cutout 38 shown in FIG. 8 with its opposite ends just abutting to each other. Also in the embodiment in FIG. 7, portions of vane shafts 16a and 16b fixed to each of nozzle vanes 15 are formed with flanges 35 shrouding the corresponding through-holes 24.

Mode of operation of the embodiments shown in FIGS. 3 and 7 will be described.

In the embodiment shown in FIG. 3, the turbine housing 1 of FIG. 1 is integrally assembled onto the bearing housing 3, using the fastening bolts 3a, with the inner peripheral end 29 of the disc spring seal 28 being fitted on the tapered surface 27a of the step 27. In this case, as shown in FIG. 5, the axial height H of the disc spring seal 28 with the frustoconical shape between the rectilinear and curved portions 30 and 33 is greater than a distance between the opposed surface 27a and the rear surface of the rear wall so that, after the assembling, the rectilinear portion 30 of the disc spring seal 28 is pressed against the opposed surface 27a, the curved portion 33 of the outer peripheral end 31 of the disc spring seal 28 being pressed against the rear surface of the rear wall 11. Thus, the sealing device 25 in the form of the disc spring seal 28 can prevent the exhaust gas in the scroll passage 8 from leaking through the gap between the turbine housing 1 and the rear wall 11.

In the embodiment shown in FIG. 7, with the disc spring seal 37 being arranged with its inner peripheral end 29 being fitted on the cylindrical surface 36b of the step 36 of the turbine housing 1, the outer peripheral end 31 of the disc spring seal 37b becomes automatically pressed against the rear surface of the rear wall 11 by the pressure of the exhaust gas in the scroll passage 8 and concurrently the disc spring seal 37 is reduced in diameter to null the cutout 38 in FIG. 8 with its opposed ends abutting to each other. Thus, the above-mentioned sealing device 25 in the form of the disc spring seal 37 can prevent the exhaust gas in the scroll passage 8 from leaking through the gap 19 between the turbine housing 1 and the rear wall 11.

In this case, the sealing device 25 is arranged upstream, in the travel direction of the exhaust gas, of (or nearer to the scroll passage 8 than) the through-holes 24 through which the vane shafts 16b extend through the rear wall 11, so that the gap 19 downstream of the disc spring seal 28 or 37 is low in pressure P2 and has relationship of P1>P2 with respect to the pressure P1 in the exhaust nozzle 9; as a result, the exhaust gas in the exhaust nozzle 9 is allowed to flow downstream of the disc spring seal 28 or 37 as shown by arrow B. Due to the pressure difference P1>P2 as mentioned above, the nozzle vanes 15 are pushed and displaced to the rear wall 11 into abutment with the latter; thus, the clearance between the respective nozzle vanes 15 and the rear wall 11 is minimized. In this case, a portion of each of the vane shafts 16b extending through the rear wall 11 which is fixed to the nozzle vane 15 is provided with a flange 35 shrouding the through-hole 24, so that the pressure of the exhaust gas in the exhaust nozzle 9 acts on the flange 35 which is then pushed against the rear wall 11 to close the through-hole 24. This reduces flow rate of exhaust gas leaking as shown by the arrow B and can prevent the exhaust gas passing through between the front and rear walls 10 and 11 from escaping into the through-holes 24 and gap 19. Thus, the exhaust gas can be effectively fed to the turbine impeller 4 with no gas leakage and effectively rotate the turbine impeller 4. Even if no flanges 35 are provided, by lowering the pressure P2 in the gap 19 than ever, i.e., by reducing the force acting on the rear surface of the vane shaft 16b adjacent to the gap 19, the nozzle vanes 15 may be displaced toward the rear wall 11; however, the displacement of the nozzle vanes 15 is ensured by providing the flanges 35.

Figure 9:
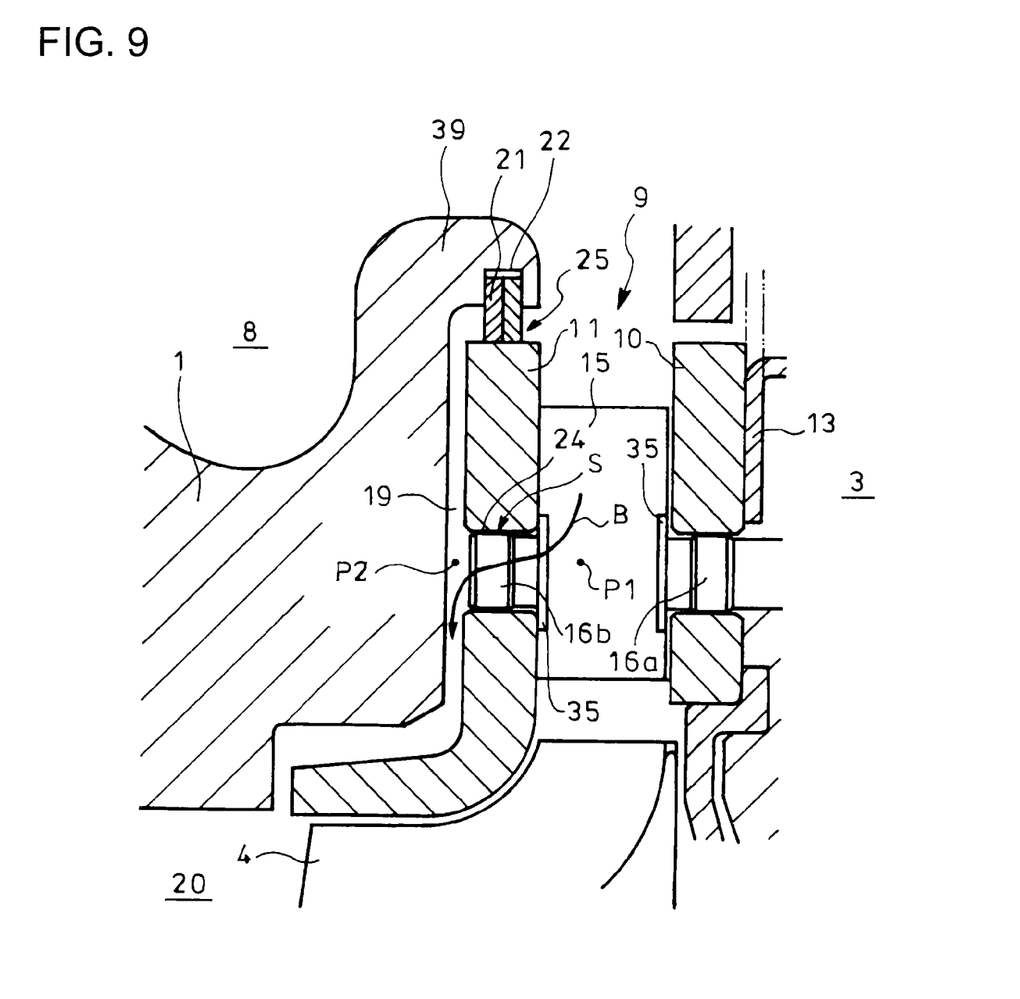
FIG. 9 is a sectional side view showing a further embodiment of the invention.

FIG. 9 shows a further embodiment of the invention in which a turbine housing 1 has an extension 39 extending into a position spaced apart from an outer periphery of a rear exhaust introduction wall 11. Arranged between the extension 39 and the outer periphery of the rear wall 11 is a sealing device 25 which comprises sealing piston rings 21 fitted in a groove 22, just like FIGS. 1 and 2, which is formed on the extension 39.

Also in the embodiment of FIG. 9, the sealing device 25 is arranged upstream, in a travel direction of exhaust gas, of through-holes 24 via which vane shafts 16b extend through the rear wall 11, so that pressure P2 of a gap 19 downstream of the sealing device 25 is lowered to have a relationship P1>P2 with respect to pressure P1 in the exhaust nozzle 9. Thus, the exhaust gas in a exhaust nozzle 9 flows as shown by arrow B into the gap 19 downstream of the sealing device 25. Due to the pressure difference of P1>P2, nozzle vanes 15 are pushed to the rear wall 11, clearance between the respective nozzle vanes 15 and the rear wall 11 being minimized.

Figure 10:
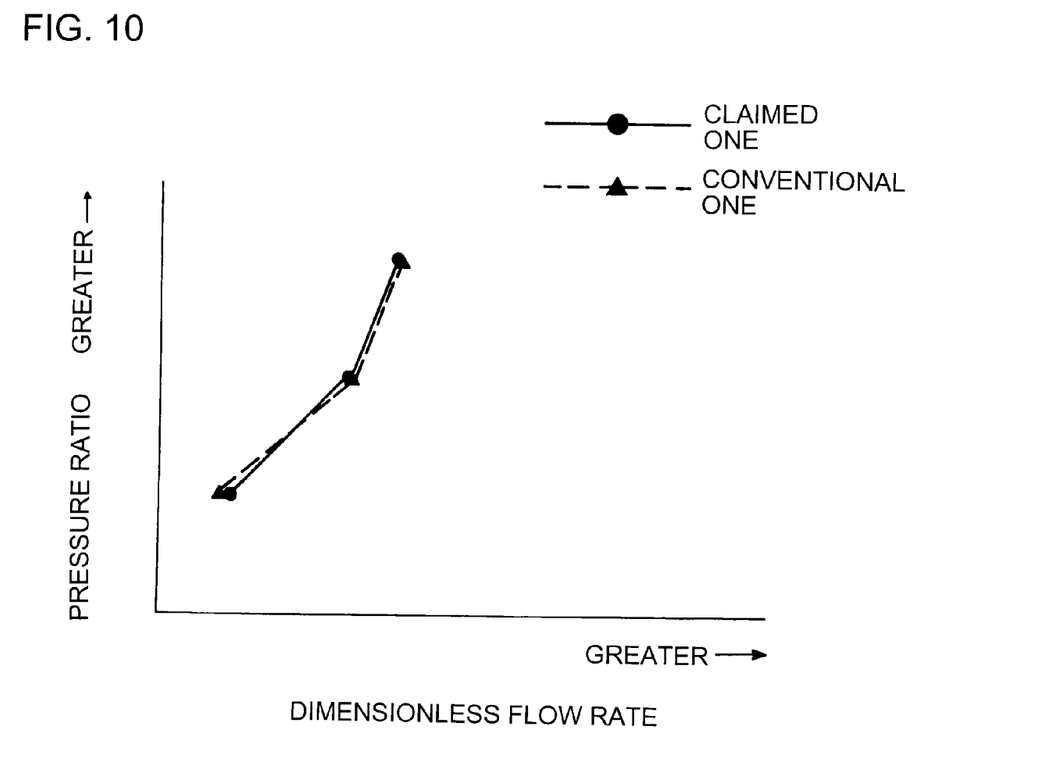
FIG. 10 is a diagram for showing conditioning conventional and claimed turbochargers to have substantially same pressure ratios between upstream and downstream sides of turbine impeller.

On the conditioning that a conventional turbocharger (conventional one) and a turbocharger of the invention (claimed one) shown in FIG. 3 are made to have substantially same pressure ratios between upstream and downstream sides of turbine impeller 4 as shown in FIG. 10, the inventor determined velocity distribution of the exhaust gas at radial positions in turbine impeller outlet 20 through numerical analysis (at three points). The results are shown in FIG. 11.

Figure 11:
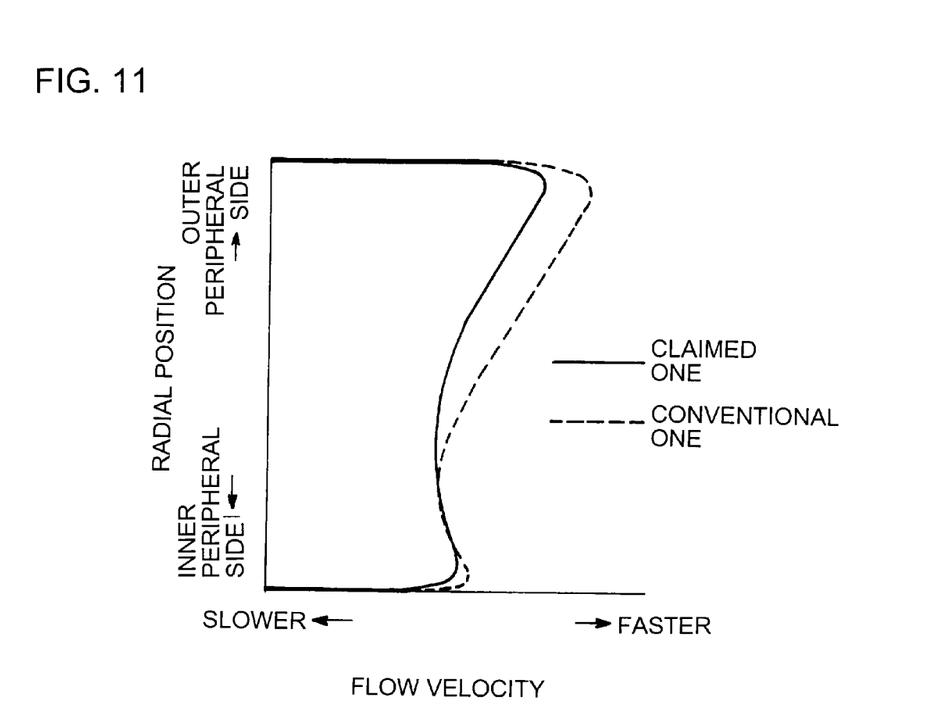
FIG. 11 is a diagram showing results from numerical analysis on velocity distribution of exhaust gas in radial positions in comparison of the conventional turbocharger with the claimed turbocharger.

As is clear from FIG. 11, in comparison with the conventional one, the claimed one has radially flattened flow velocity distribution with less deviation. This means that the claimed one has less turbulence of exhaust gas in turbine impeller outlet 20 in comparison with the conventional one.

Figure 12:
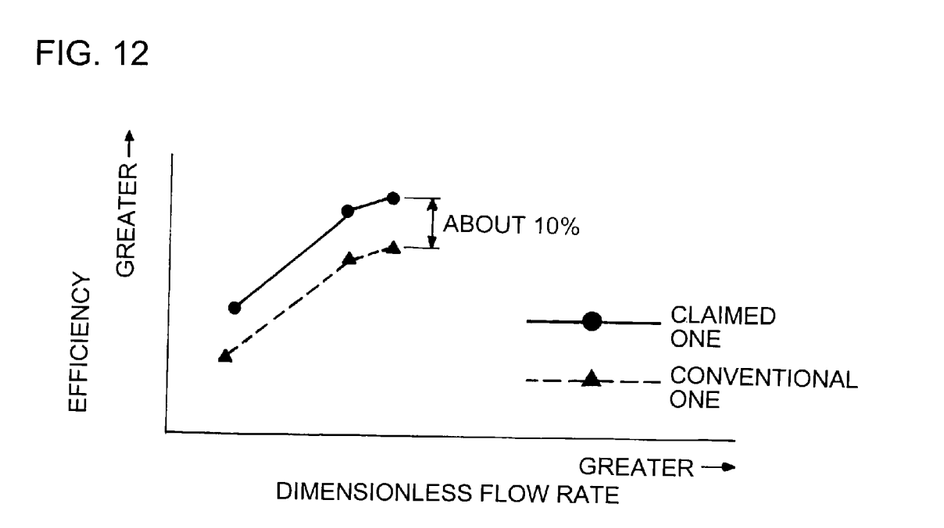
FIG. 12 is a diagram showing results from numerical analysis on turbine efficiency in comparison of the conventional turbocharger with the claimed turbocharger.
Figure 13:
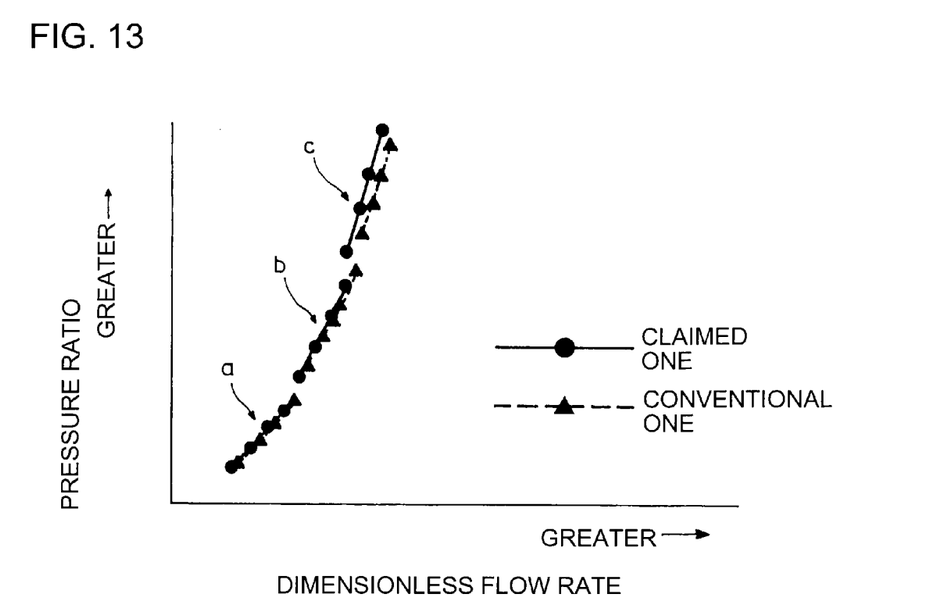
FIG. 13 is a diagram showing results from actual measurement on velocity distribution of exhaust gas in radial positions in comparison of the conventional turbocharger with the claimed turbocharger.

Moreover, turbine efficiency was compared between the claimed and conventional ones through numerical analysis. As a result, it was found out as shown in FIG. 12 that the claimed one has turbine efficiency improved by about 10% relative to the conventional one.

Figure 14:
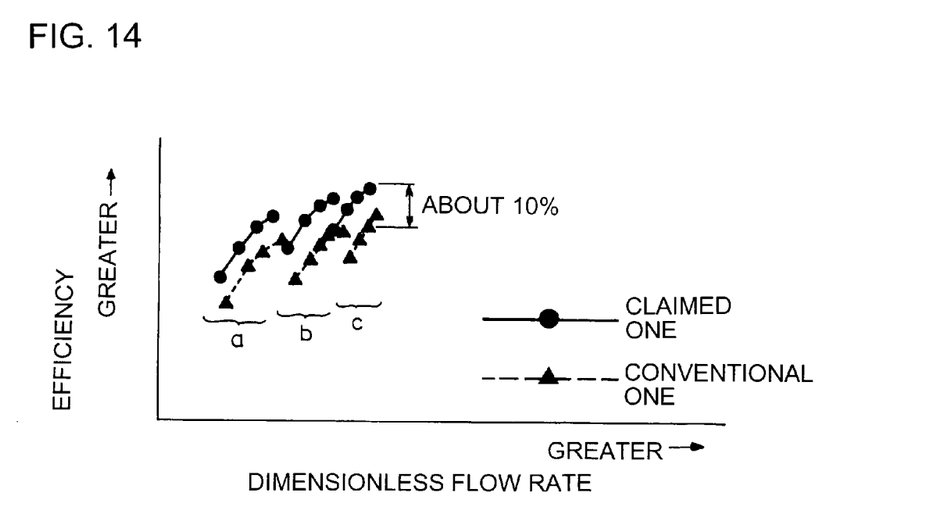
FIG. 14 is a diagram showing results from actual measurement on turbine efficiency in comparison of the conventional turbocharger with the claimed turbocharger.

On the conditioning that the conventional turbocharger (conventional one) and the turbocharger of the invention (claimed one) as shown in FIG. 3 are made to have substantially same pressure ratios as shown in FIG. 10, the inventor actually measured turbine efficiency (at four points) with respect to three different rotational velocities a, b and c. The results are shown in FIG. 14. Also in this actual measurement, just like the above-mentioned results by the numerical analysis, the claimed one has turbine efficiency improved by about 10% relative to the conventional one.

The exhaust gas in the scroll passage 8 passes through the nozzle vanes 15 of the exhaust nozzle 9 to the turbine impeller 4. Because of such exhaust gas flow being a complex three-dimensional stream, it is much difficult to find out factors in turbulence of the exhaust gas in the turbine impeller outlet 20.

However, as mentioned in the above, the sealing device 25 for sealing of the gap 19 between the turbine housing 1 and the rear wall 11 is arranged upstream, in the travel direction of the exhaust gas, of the through-holes via which the vane shafts 16b extend through the rear wall 11, so that the difference in pressure between the gap 19 downstream of the sealing device 25 and the exhaust nozzle 9 can urge the respective nozzle vanes 15 to the rear wall 11 to minimize the clearance between the respective nozzle vanes 15 and the rear wall 11, whereby the velocity distribution of the exhaust gas at radial positions in the turbine impeller outlet 20 become flattened to reduce turbulence of the exhaust gas in the turbine impeller outlet 20; this can be construed to be considerable improvement in turbine efficiency. Thus, it was found out that the clearance between the respective nozzle vanes 15 and the rear wall 11 is one of factors affecting turbulence of the exhaust gas in the turbine impeller outlet 20 and thus affecting turbine efficiency. According to the embodiments of the invention, clearance between the respective nozzle vanes 15 and the front exhaust introduction wall 10 is increased by the preliminarily existing clearance for rotation and pivot of the nozzle vanes 15 (that is, clearance between the nozzle vanes 15 and the front wall 10 is widened by a degree corresponding to the decreased clearance between the nozzle vanes 15 and the rear wall 11); it was found out even in such a case that the clearance between the nozzle vanes 15 and the front wall 10 hardly affects the turbulence of the exhaust gas in the turbine impeller outlet 20 and thus the turbine efficiency.

Thus, according to the invention, by the simple structure that the sealing device 25 for sealing of the gap 19 is arranged upstream, in the travel direction of the exhaust gas, of the through-holes 24 via which the vane shafts 16b extend through the rear wall 11, the nozzle vanes 15 are displaced to the rear wall 11 to minimize the clearance between the respective nozzle vanes 15 and the rear wall 11, whereby turbine efficiency can be substantially improved.

In the embodiments mentioned in the above, the disc spring seal 28 has substantially S-shaped section (see FIG. 3); however, the invention is not limited thereto. For example, the disc spring seal 28 in FIG. 3 may be without the curved portion 33 or the rectilinear portion 30; alternatively, it may comprises only the slant portion 32 (that is, it may be frustoconical with its diameter gradually and constantly increased toward the rear wall 11. In such cases, the disc spring seal 28 may be simplified in structure, advantageously resulting in, for example, reduction in production cost.

It is to be understood that the present invention is not limited to the above embodiments and that various changes and modifications may be made without leaving the scope of the invention. For example, the sealing device may be of any structure among various structures.

The invention claimed is:

1. A turbocharger comprising:
a turbine housing having a scroll passage outwardly of an exhaust nozzle which is arranged outwardly of a turbine impeller rotatably supported on a bearing housing and guides exhaust gas from the scroll passage to the turbine impeller, said exhaust nozzle having a plurality of nozzle vanes between front and rear exhaust introduction walls on sides of the bearing and turbine housings, respectively, vane shafts fixed to opposite sides of each of said nozzle vanes extending through the front and rear walls and being rotatably supported, the rear wall being arranged to have a gap between said rear wall and the turbine housing, through-holes of the rear wall communicating with said gap,
wherein a sealing device for preventing the exhaust gas from said scroll passage from leaking via said gap to the turbine impeller is arranged upstream, in a travel direction of the exhaust gas, of the through-holes via which the vane shafts extend through the rear wall, whereby pressure in said gap communicating with said through-holes of the rear wall is kept lower than pressure in the exhaust nozzle and the exhaust gas in the exhaust nozzle flows through the through-holes into the gap so as to displace the nozzle vanes to the rear wall.

2. The turbocharger as claimed in claim 1, wherein a portion of each of the vane shafts extending through the rear wall which is fixed to a corresponding nozzle vane is formed with a flange shrouding a corresponding through-hole.

3. The turbocharger as claimed in claim 1, wherein the turbine housing presents a portion confronting a vertical surface of the rear wall such that the gap is provided therebetween, an outer periphery of the portion is cut out to provide a step comprising a vertical opposed surface which is substantially parallel to a rear surface of the rear wall, and a disc spring seal is fitted between the step and the rear surface of the rear wall.

4. The turbocharger as claimed in claim 3, wherein the disc spring seal is ring-shaped, and has a vertical rectilinear portion contiguous with an inner peripheral end and pressed against the vertical surface of the step, a slant portion extending slantingly from the rectilinear portion toward the rear wall, and a curved portion peripherally of the slant portion and curved in a direction away from the rear wall.

5. The turbocharger as claimed in claim 4, wherein the inner peripheral end of the disc spring seal is curved from the rectilinear portion in a direction approaching to the rear wall and extending vertically and inwardly into substantially S-shape.

6. The turbocharger as claimed in claim 3, wherein the disc spring seal is frustoconical, and inner and outer peripheral edges of the disc spring seal are mutually offset with respect to an axis of the spring.

7. The turbocharger as claimed in claim 6, wherein an axial height of the disc spring seal between the rectilinear portion of the curved portion is greater than a distance between the opposed surface and the rear surface of the rear wall.

8. The turbocharger as claimed in claim 3, wherein the step further comprises an annular tapered surface, diameters of which being decreased in a direction away from the rear wall.

9. The turbocharger as claimed in claim 3, wherein the step further comprises a cylindrical surface parallel with an axis of a turbine shaft.

10. The turbocharger as claimed in claim 9, wherein the disc spring seal is substantially ring-shaped and circumferentially cut out partly, the disc spring seal presents an inner peripheral end curved in a direction away from the rear wall and fitted on the cylindrical surface, and an outer peripheral end formed with a curved portion abutting the rear surface of the rear wall, and the disc spring seal is frustoconical with increased diameters from the inner peripheral end toward the rear wall.

11. The turbocharger as claimed in claim 1, wherein the turbine housing presents an extension extending into a position spaced apart from an outer periphery of the rear wall, and sealing rings are arranged between the extension and the outer periphery of the rear wall.

12. The turbocharger as claimed in claim 11, where a groove is provided in the extension, and the sealing rings are fitted in the groove.

\* \* \* \* \*